Feb. 1, 1944.    A. W. HANSON    2,340,834
TREATMENT OF VINYLIDENE CHLORIDE
Filed June 27, 1942
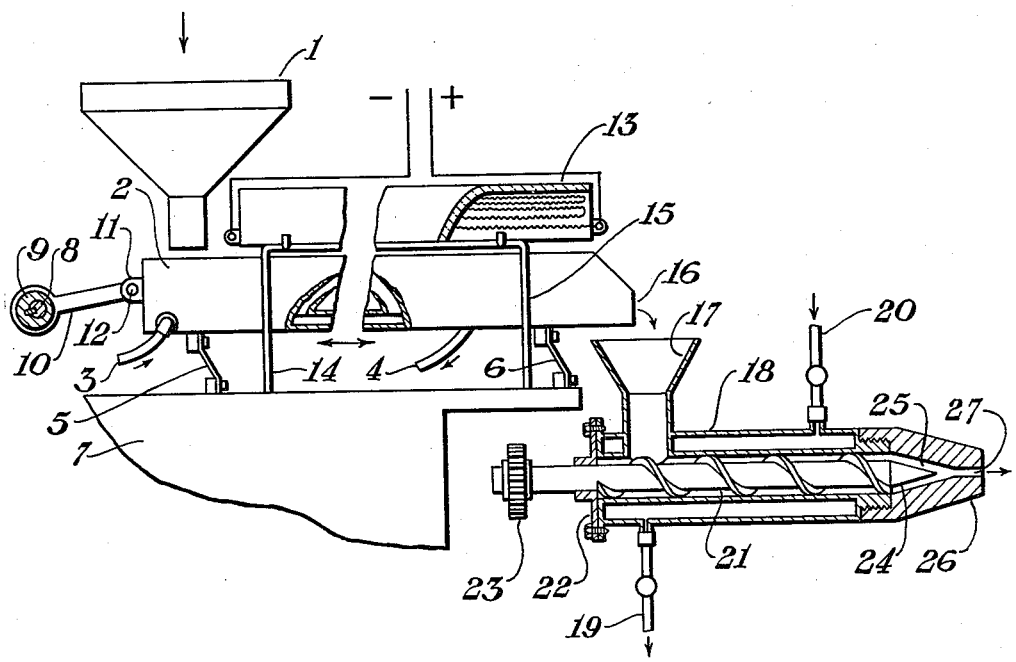
INVENTOR.
Alden W. Hanson
BY
Griswold & Burdick
ATTORNEYS Patented Feb. 1, 1944

2,340,834

UNITED STATES PATENT OFFICE 2,340,834

TREATMENT OF VINYLIDENE CHLORIDE

Alden W. Hanson, Midland, Mich., assignor to The Dow Chemical Company, Midland, Mich., a corporation of Michigan Application June 27, 1942, Serial No. 448,859

5 Claims. (Cl. 18—55)

The invention relates to an improved method useful in connection with preparing polymeric vinylidene chloride for processing operations such as molding, extruding, calendering, and the like.

The term "polymeric vinylidene chloride" as used herein and in the appended claims includes polymers, copolymers, and interpolymers of vinylidene chloride wherein the polymerized vinylidene chloride is present in substantial amount. Such polymeric vinylidene chloride may be obtained by polymerizing together monomeric vinylidene chloride in major proportion with one or more other polymerizable materials such as vinyl chloride, vinyl acetate, styrene, the esters of acrylic or methacrylic acid, allyl and related esters of carboxylic or inorganic acids, unsaturated ethers, etc.

When processing polymeric vinylidene chloride, such as for example when extruding cord or tubing in a continuous manner, it is one practice to feed powder or other finely divided material continuously to a specially designed screw conveyer and to heat the material during its passage through the screw so that by the time the material has been forwarded to the extruding die it is hot enough to be in a softened or plastic state. In this state it may be readily and continuously forced through the die by the action of the screw to produce the desired product.

In actual practice it has been found that the above method possesses several disadvantages due to the inherent properties of the material which greatly curtail the rate at which production of the finished product would be expected. For example, as the material is fed into the conveyer in powdered or other finely divided form and gradually heated to a plastic mass, it passes through a stage during which the screw in applying the necessary pressure to forward the material acts to form very hard stone-like masses which tend to feed with great difficulty through the screw causing uneven feeding with attendant irregularities in the finished extruded product. At the same time the heat conductivity of the material is so poor it is very difficult to obtain a uniformly softened mass at the forward end of the screw even though both the housing and the screw flight are heated. Additionally, the relatively low decomposition temperature of the vinylidene chloride polymer makes it extremely difficult to apply sufficient heat to bring the material to the proper hot working temperature in a screw forwarding device of any practical length. Even if an excessively long screw is employed and the heat applied slowly, the method is not entirely satisfactory due to the above-mentioned characteristics of the vinylidene chloride polymer of becoming compacted into hard stone-like masses as the screw applies the sustained pressure necessary to forward the material. In subjecting polymeric vinylidene chloride to other processing operations, such as all types of molding, calendering, and the like, similar difficulties are encountered in supplying the vinylidene chloride polymer to the actual processing device.

It is, therefore, the principal object of the invention to provide a method suitable for heating and supplying polymeric vinylidene chloride molding powder or the like to processing machines such as are commonly used.

Other objects and advantages will be apparent as the description of the invention proceeds.

The invention resides in the discovery that, as a preliminary to forming operations, a subdivided polymeric vinylidene chloride material, such as a molding powder, should be preheated to a temperature at which the material is plastic before any considerable or sustained pressure is applied thereto. The preheated material may then be subjected to pressure, as in the screw feeder of an extrusion press, without being compacted into hard masses or balls which do not coalesce into a homogeneous mass. By such means not only is a better and more homogeneous formed product obtained, but also a large increase in the output of the forming machine is made possible. The following description, taken in connection with the annexed drawing, sets forth in detail a method and apparatus suitable for carrying out the invention.

In the drawing the single figure is a diagrammatic view in side elevation of an apparatus suitable for carrying out the method of the invention. As shown, the device comprises a feed hopper 1 through which the finely divided or powdered vinylidene chloride polymer is fed into an open vibrating forwarding trough 2. Trough 2 is double walled and is provided with an inlet 3 and an outlet 4 for circulation of water to cool the sides and bottom of the trough. Trough 2 is supported upon spring legs 5 and 6 attached at either end to the bottom of the trough 2 and to the frame 7. A power driven shaft 8 is mounted in and splined to bushing 9 in slightly off center relation, the bushing being free to rotate in crank arm 10, which is in turn connected to lug 11 attached to trough 2 by means of crank pin 12. This construction causes the trough to vibrate or move in both a lateral and vertical direction as the shaft is caused to rotate. Other means may of course be employed to vibrate the trough, such as an electro-magnetic vibrator. A radiant heater, such as an electrical resistance element heater 13, is positioned directly above trough 2 and is supported by brace members 14 and 15. The open end 16 of trough 2 empties into the feed hopper 17 of a screw fed extrusion die, used by way of example and illustrating one type of processing apparatus in common use. The housing 18 surrounding the screw is double walled and provided with steam lines 19 and 20 for heating the material being fed by the screw. The screw flight 21 is supported in the flanged end 22 of the housing and is provided with a suitable sprocket 23 which may be actuated by any suitable source of power (not shown). The screw terminates in a tapered end portion 24 which forms an annular chamber 25 with the tapered extrusion head 26. The molten plastic is forced through annular chamber 25 by the screw and thereafter ejected through the orifice 27 in the extrusion head 26.

In the operation of the apparatus, the finely divided or powdered material is fed into the feed hopper 1 and is distributed therefrom onto the vibrating trough 2, where it is heated by the electrical heater as it advances along the trough. As the heat is applied cold water is circulated through the jacket of the trough in order to prevent the material from sticking to the walls of the trough. The action of the vibrating trough is to lift the particles and throw them forward along the trough, while at the same time they are exposed to the radiant heat of the heater. The heated particles are thus continually distributed through the mass of material moving along the trough, while other particles are brought to the top and exposed to direct heat. Cooling the walls of the trough 2 prevents the heated material from sticking to the surface thereof. In this manner the polymeric vinylidene chloride, as it moves forward, is heated sufficiently so that the particles are caused to coalesce into a more or less coherent plastic mass, which is discharged at the end of the trough, without any decomposition having occurred due to local overheating and without sticking. It is not necessary to heat the material in the trough to the extent that it is discharged as a plastic mass, but it is desirable, however, to heat the powder to near its softening point. Since no sustained pressure is applied to the material in the trough, it exhibits no tendency to be compacted into hard balls or masses therein. The polymeric vinylidene chloride, when fed to the screw in a preheated condition, is rapidly forwarded by the action of the screw without compacting and balling up so as to seriously affect the forwarding efficiency of the screw. Additional heat is applied as the material is forwarded by the screw by introducing high pressure steam into the jacket surrounding the screw, so that it reaches the extrusion orifice in a fused state suitable for extruding.

As an example of the improvement obtained by the new method a small screw fed extrusion machine of the type above-described was operated by feeding cold powder to it and the maximum production of extruded material obtainable was 28 pounds per hour. The same extrusion machine was operated in accordance with the method of the invention and a production of 47 pounds per hour was readily reached and the extruded article was of a more uniform nature and of better quality than that made according to standard practice. Thus the production of the extrusion apparatus was increased by 68 per cent by use of the improved method and apparatus.

It has been found that the temperature to which the polymeric vinylidene chloride should be preheated to avoid difficulty due to feeding under pressure, such as is applied by the action of the screw, depends of course on the specific composition being processed. In general it is preferable to preheat the material above about 100° C. in order to bring it to a softened or plastic condition.

Although the method and apparatus has been described with special reference to an extrusion operation, it is to be understood that the method and apparatus is applicable to similar types of operations, such as molding operations, calendering operations, or any operation wherein it is essential to work the polymeric vinylidene chloride in a heated condition.

Other means may be employed for preheating and conveying the finely divided polymeric vinylidene chloride to the screw fed extrusion machine. For example hot gas may be used to propel the charge through a suitably jacketed and cooled tube. The gas selected to conduct heat to the polymeric vinylidene chloride as the latter is moved forward through the tube is one preferably inert to vinylidene chloride at the highest temperature reached in the tube. Examples of such gases are nitrogen, helium, and the well known inert gases.

I claim:

1. A method of preparing a subdivided polymeric vinylidene chloride material for a forming operation which comprises heating said material while causing the same to move over a cooled supporting surface without application of substantial pressure thereon.

2. A method of preparing a subdivided polymeric vinylidene chloride material for a forming operation which comprises heating said material to a temperature above about 100° C. and below the decomposition temperature of said material, while causing the same to move over a cooled supporting surface without the application of substantial pressure thereon.

3. The method of preparing a subdivided polymeric vinylidene chloride material for a forming operation which comprises heating said material to a temperature between about 100° C. and its melting point while causing the same to be propelled along a cooled supporting surface without the application of a substantial pressure thereon.

4. In a method of forming finely divided particles of polymeric vinylidene chloride into shaped bodies, the steps which comprise first preheating the material by radiant heat to a temperature above the softening point and below the decomposition temperature of the same while causing it to move over a cooled surface without the application of substantial pressure thereon, and thereafter further heating the material to fuse the same by contacting it with a heated surface.

5. In a method of treating finely divided particles of polymeric vinylidene chloride prior to forming the same, the step which consists in causing said material to move over a cooled surface while subjecting the particles to the direct action of radiant heat without the application of a substantial pressure thereon so as to bring the material to a temperature of above about 100° C. and below the decomposition temperature of the material.

ALDEN W. HANSON.